Patented Sept. 8, 1953

2,651,656

UNITED STATES PATENT OFFICE 2,651,656

PROCESS OF PREPARING TETRAALKYL ESTERS OF 1,2-ETHANEDIPHOSPHONIC ACID

Elbert C. Ladd and Merlin P. Harvey, Passaic, N. J., assignors to United States Rubber Company, New York, N. Y., a corporation of New Jersey No Drawing. Application April 17, 1950, Serial No. 156,504

5 Claims. (Cl. 260—461)

This invention relates to a new and improved process of making adducts of dialkyl phosphites and dialkyl esters of ethenephosphonic acid. This application is a continuation-in-part of our copending application, Serial Number 38,177, filed July 10, 1948.

Compounds of the type made by our invention are not new, having been made by Ford-Moore and Williams, J. Chem. Soc., 1465–1467 (1947); 42 C. A. 2229 by the Arbuzov reaction. These authors reacted ethylene bromide with two mols of trialkyl phosphite, thus replacing each of the bromine atoms with a dialkylphosphono group. However this method is subject to numerous objections including the requirement that ethylene bromide be used, the requirement that trialkyl phosphites be used and the fact that valuable alkyl bromide is split off by the reaction. Recovery of such alkyl bromide is difficult and often there is no outlet readily at hand for the recovered alkyl bromide.

Our invention provides a simple and effective method of making tetraalkyl ester of 1,2-ethanedisphosphonic acid, having the formula

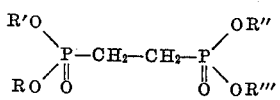

where R, R', R'' and R''' are alkyl groups, which overcomes the foregoing objections and is not subject to the limitations of the method used by the above authors.

We have discovered that compounds of the type described above can be made by simply heating a mixture of the dialkyl phosphite and the dialkyl ester of ethenephosphonic acid in the presence of a basic catalyst. Suitable basic catalysts are those in the group consisting of alkali and alkaline earth metals, e. g., lithium, sodium, potassium, magnesium and calcium, and their oxides, hydroxides and alcoholates.

The preferred catalyst is an alkali metal, especially metallic sodium, which may be dissolved in the dialkyl phosphite to form a solution which may be commingled with the dialkyl ester of ethenephosphonic acid. Preferably this intermixture is effected gradually because it is accompanied by an exothermic reaction. After this admixture has been completed, the resulting mixture is heated to a suitable temperature, typically ranging from 50° C. to 125° C., and is held at this temperature until reaction is substantially complete. When reaction is complete, the adduct is recovered from the reaction mixture in any suitable manner, preferably by fractional distillation under reduced pressure.

The compounds so produced have utility as intermediates in the synthesis of other chemicals, and as plasticizers, insecticides, lubricants and lubricating oil additives, etc.

Any dialkyl phosphite may be used in the practice of our invention. The alkyl groups therein are generally the same but they may be different. Alkyl groups having from 1 to 20 carbon atoms or even more may be used. For reasons of economy and availability, we generally use the lower alkyl groups, such as methyl, ethyl, propyl, etc.

Any dialkyl ester of ethenephosphonic acid may be used in the practice of our invention. Again the alkyl groups are generally the same but may be different; alkyl groups having from 1 to 20 carbon atoms or even more may be used; we generally use the lower alkyl groups such as methyl, ethyl, propyl, etc.

The reaction of the present invention may be illustrated by the following equation:

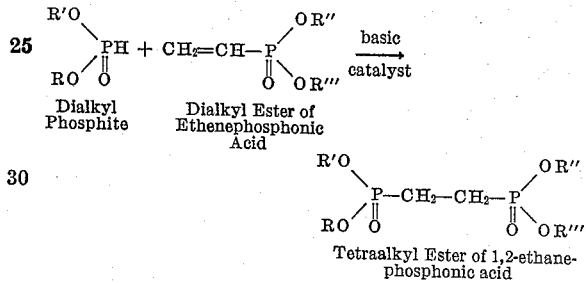

In this equation R, R', R'' and R''' are all alkyl groups.

The relative proportions of the dialkyl phosphite and the dialkyl ester of ethenephosphonic acid may vary widely. The 1:1 adduct is substantially the sole addition product formed regardless of the relative proportions of the two reactants employed. We generally use approximately equimolar proportions of the reactants, there being no good reason for wide departure from this ratio. The amount of the catalyst employed may likewise vary within wide limits. Generally speaking, we use an amount ranging from 0.05 to 2% by weight of the catalyst, based on the weight of the dialkyl phosphite.

The following example illustrates our invention in more detail.

*Example*

A small piece of sodium (about 0.1 gram) is dissolved in 13.82 grams of diethyl phosphite and to the resulting solution is added slowly 16.41 grams of diethyl ethenephosphonate, during the course of about 15 minutes. There is a slightly exothermic reaction, the temperature of the mixture rising about 10° C. After the addition is complete the mixture is heated to 80° C. for one-half hour, then allowed to cool and remain at room temperature overnight. A ten-gram portion of the mixture was withdrawn and the remainder distilled to yield the following fractions:

5.9 gms. b. 35–40 at 0.25/mm.; $n_D^{20}$=1.4146
1.4 gms. b. 40–140 at 0.25/mm.; $n_D^{20}$=1.4230
2.3 gms. b. 140–145 at 0.25/mm.; $n_D^{20}$=1.4385
5.4 gms. residue; $n_D^{20}$=1.4410

The fraction boiling 140–145° C. at 0.25 mm. is found to contain P, 20.59%. Calcd. for $C_{10}H_{20}O_6P_2$:P, 20.49%. The product is therefore tetraethyl ethane-1,2-diphosphonate.

From the foregoing it will be seen that we have made available to the art, a simple and economical method of making the adducts of dialkyl phosphites and dialkyl esters of ethenephosphonic acid. The reaction is direct and does not involve any elimination of material representing a loss. The recovery of the adduct from the reaction mixture is easily and economically accomplished. Many other advantages of our invention will be apparent to those skilled in the art.

Having thus described our invention what we claim and desire to protect by Letters Patent is:

1. The process of making a tetraalkyl ester of 1,2-ethanediphosphonic acid which comprises heating a mixture of a dialkyl phosphite and a dialkyl ester of ethenephoshonic acid in the presence of a basic catalyst selected from the group consisting of alkali and alkaline earth metals and their oxides, hydroxides and alcoholates, and recovering said tetraalkyl ester from the resulting reaction mixture.

2. The process of making a tetraalkyl ester of 1,2-ethanediphosphonic acid which comprises heating a mixture of a dialkyl phosphite and a dialkyl ester of ethenephosphonic acid in the presence of an alkali metal as a catalyst, and recovering said tetraalkyl ester from the resulting reaction mixture.

3. The process of making a tetraalkyl ester of 1,2-ethanediphosphonic acid which comprises heating a mixture of a dialkyl phosphite and a dialkyl ester of ethenephosphonic acid in the presence of metallic sodium as a catalyst, and recovering said tetraalkyl ester from the resulting reaction mixture.

4. The process of making the tetraethyl ester of 1,2-ethanediphosphonic acid which comprises heating a mixture of diethyl phosphite and diethylethenephosphonate in the presence of metallic sodium as a catalyst, and recovering said tetraethyl ester from the resulting reaction mixture.

5. The process of claim 1 wherein said reaction step is carried out at a temperature ranging from 50° C. to 125° C.

ELBERT C. LADD.
MERLIN P. HARVEY.

References Cited in the file of this patent

UNITED STATES PATENTS

| Number | Name | Date |
|---|---|---|
| 2,478,390 | Hanford et al. | Aug. 9, 1949 |
| 2,492,994 | Harman et al. | Jan. 3, 1950 |